UNITED STATES PATENT OFFICE.

FRANCIS J. CONBOY, OF AUBURN, NEW YORK.

COMPOSITION OF MATTER.

939,982. Specification of Letters Patent. Patented Nov. 16, 1909.

No Drawing. Application filed November 28, 1908. Serial No. 464,818.

*To all whom it may concern:*

Be it known that I, FRANCIS J. CONBOY, of Auburn, in the county of Cayuga, in the State of New York, have invented new and useful Improvements in Composition of Matter, of which the following, taken in connection with the accompanying drawings, is a full, clear, and exact description.

This invention relates to certain improvements in a new composition of matter which is particularly adapted as an economical substitute for hard rubber and is capable of practically all uses to which such rubber is applied, such for example as electrical insulation, parts of gun stocks, mouth and ear pieces for telephones, speaking tubes and the like, and for any other articles of manufacture which may be made of rubber.

My object is to produce a composition having the color, hardness, insulating properties and other characteristics of rubber, at a very small percentage of the cost of such rubber and to enable such composition to be used in all relations and associations where hard rubber may be employed.

Another object is to enable such composition to be manufactured or molded in a smooth, glossy and finished condition in a single operation without subsequent polishing or finishing.

The invention broadly consists in mixing together a comminuted body of incombustible material together with a viscous substance which readily sets to a high degree of hardness upon cooling, using a suitable ciliary or fibrous bond and a non-viscous substance which are thoroughly incorporatd in the mixture, the bond serving to increase the tensile strength of the molded body while the non-viscous substance prevents adhesion of the plastic body to the sides of the mold or dies while such body is being formed.

The ingredients and proportions employed in the manufacture of the composition are preferably as follows: 30 lbs. of comminuted or pulverized mineral asbestos. 30 lbs. of tar or pitch, 4 lbs. of cotton or similar fibrous ingredient and one-half pound of carnauba or equivalent wax, all of which ingredients are thoroughly mixed and incorporated into a plastic body thereby softening the tar and wax by heating and kneading the other ingredients thereinto or by pulverizing the cold tar or pitch and also the wax and then thoroughly mixing the ingredients together after heating the mixture sufficiently to render it plastic and moldable to the desired form in suitable dies. The asbestos forms what may be termed the body of the composition while the tar or pitch serves to cohesively bind the comminuted particles of asbestos together. The cotton or other fibrous ingredient serves as a bond to bind the mixture of tar and asbestos together to reduce its fragility and increase its tensile strength while the wax prevents the adhesion of the composition to the sides of the mold or die during the formation of the article and at the same time gives a finished, glossy appearance to the surface of said article under pressure of the dies without further treatment, said molded article being allowed to cool or set in the mold after which it may be removed and used for the purpose for which it is intended.

What I claim is:

A composition of matter comprising the following ingredients in the proportions named:—30 pounds of asbestos, 30 pounds of tar or pitch, four pounds of cotton or equivalent fibrous substance and one-half pound of carnauba or equivalent wax, thoroughly mixed together to form a composite body.

In witness whereof I have hereunto set my hand this 26th day of October 1908.

FRANCIS J. CONBOY.

Witnesses:
WILLIAM J. BRICKS.
J. HENRY KERR.